No. 697,123. Patented Apr. 8, 1902.
J. E. WOODBRIDGE.
MEANS FOR TRANSMITTING ELECTRICAL ENERGY.
(Application filed Sept. 20, 1901.)
(No Model.)
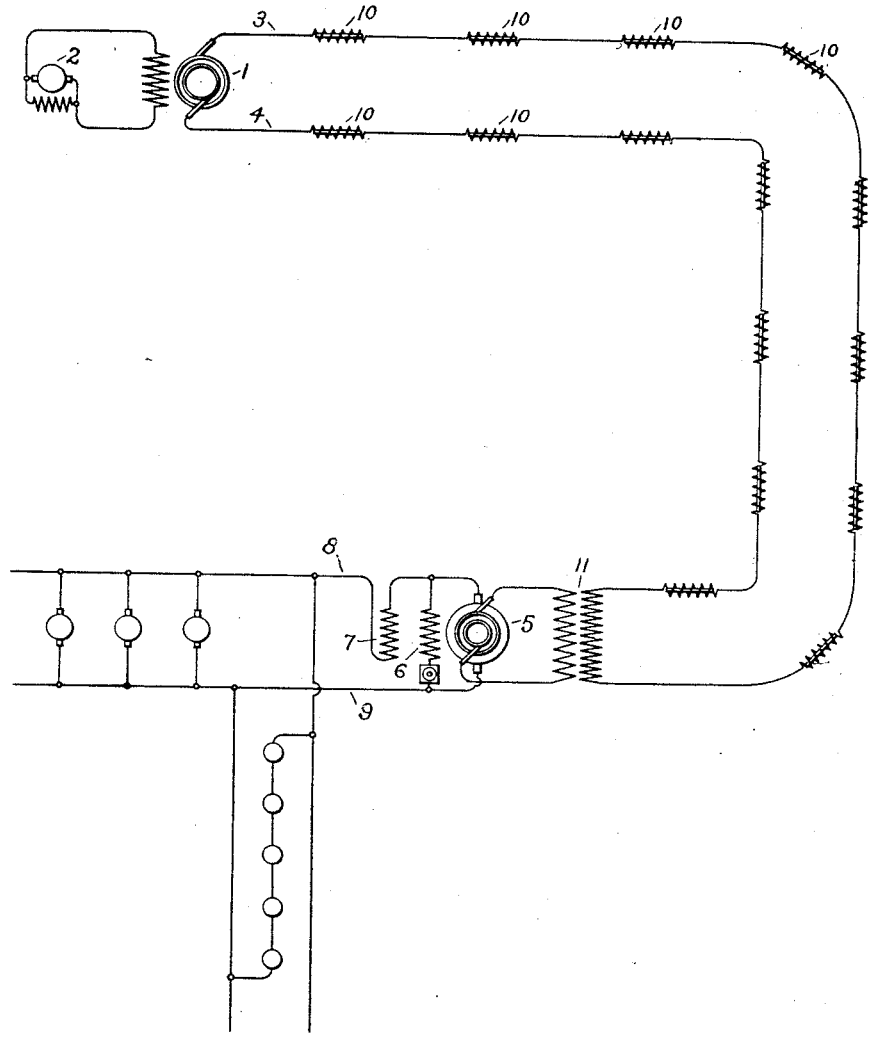
Witnesses.
John Ellis Glenn.
Benjamin B Hull
Inventor.
Jonathan E. Woodbridge.
by Albert G. Davis
Atty.
THE NORRIS PETERS CO., PHOTO-LITHO., WASHINGTON, D. C.

UNITED STATES PATENT OFFICE.

JONATHAN E. WOODBRIDGE, OF SCHENECTADY, NEW YORK, ASSIGNOR TO GENERAL ELECTRIC COMPANY, A CORPORATION OF NEW YORK.

MEANS FOR TRANSMITTING ELECTRICAL ENERGY.

SPECIFICATION forming part of Letters Patent No. 697,123, dated April 8, 1902.

Application filed September 20, 1901. Serial No. 75,733. (No model.)

*To all whom it may concern:*

Be it known that I, JONATHAN E. WOODBRIDGE, a citizen of the United States, residing at Schenectady, in the county of Schenectady and State of New York, have invented certain new and useful Improvements in Means for Transmitting Electrical Energy, (Case No. 1,779,) of which the following is a specification.

In polyphase transmission to rotary converters, and particularly to rotary converters used for railway-supply, where compounding or overcompounding is desirable, it is now common practice to make use of the reactance of leading and lagging currents on line inductances to obtain at the receiving end constant voltage invariable with load variations or to obtain voltage at the receiving end rising with increasing load, the pressure at the transmitting end remaining constant. The field strength of the rotaries is varied by the load generally by the application of series coils, so that the phase relation of the line-currents and impressed electromotive forces changes with the load, the currents lagging behind the impressed electromotive forces at light loads and leading them at heavy loads. As the current changes from lagging at light loads to leading at heavy loads the impedance drop in the line is changed from partial opposition to partial conjunction with the impressed electromotive force, thereby causing the electromotive force at the receiving end of the line, which is the resultant of the impressed electromotive force and impedance drop, to change from a value less than the impressed electromotive force to a value which may be greater.

To accomplish the results mentioned, it has been customary to put the reactive coils in the low-tension supply from the step-down transformers to the rotary converters. I have discovered that if the inductive reactance is distributed over the whole length of the transmission-line rather than localized at the receiving end in accordance with present custom a uniform boosting effect may be produced over the whole length of the transmission-line, thereby enabling a uniform difference of potential to be maintained between the transmission wires or lines throughout the whole length of the circuit. The electromotive force at the receiving end being made the same at all loads as that at the transmitting end embodies the important advantage of increased economy in those cases where the pressure at the transmitting end is as high as conditions of safety will permit and where the drop in the line under the usual conditions would be great.

The drawings illustrate diagrammatically a system embodying my invention, the features of novelty of which are pointed out in the appended claims.

For simplicity of illustration the invention is shown as embodied in a single-phase system; but it will be understood that it is equally applicable to polyphase systems, and in practice would more often be employed in connection with the latter.

In the drawings the transmitting end of an alternating-current system is represented conventionally by a generator 1 and its exciter 2. Transmission-lines 3 4 extend therefrom to a distance and supply current to the receiving end of the circuit, (represented in this case as consisting of a step-down transformer 11 and a rotary converter 5.) Although but a single rotary converter is illustrated, it is obvious that any number may be employed, if desired, and that other translating devices may be supplied without departing from the spirit of my invention. The rotary converter 5 is provided with the usual shunt and series windings 6 and 7, respectively. Translating devices, such as railway motors or lamps, may be supplied by the rotary converter from its direct-current leads 8 9, as indicated.

Distributed at intervals along the transmission-lines 3 4 are more or less numerous inductance or reactance coils 10 in series with the lines, these numerous reactive coils taking the place of the coils usually inserted in the transmission-lines in the immediate vicinity of the rotary converter or converters. The reactive effect being distributed over the whole transmission-line instead of localized produces a uniform boosting effect in place of the localized boosting effect heretofore obtained.

What I claim as new, and desire to secure by Letters Patent of the United States, is—

1. The combination of a source of alternating currents, lines extending therefrom, inductance-coils connected at intervals in said lines, and a compound-wound rotary converter supplied with current from said lines.

2. The combination of a source of alternating currents, transmitting-lines extending therefrom, a series of inductance-coils connected in each line, and a compound-wound rotary converter connected to the receiving end of the transmission-lines.

3. The combination of a source of alternating currents, transmitting-lines extending therefrom, inductance-coils located at intervals in said lines, and a source of leading current connected to the receiving end of the transmission-lines.

4. The combination of a source of alternating current, transmission-lines supplied thereby, inductance-coils connected at regular intervals in said lines, and a source of leading current such as a rotary converter supplied with current from the receiving end of the transmission-lines.

In witness whereof I have hereunto set my hand this 16th day of September, 1901.

JONATHAN E. WOODBRIDGE.

Witnesses:
BENJAMIN B. HULL,
MARGARET E. WOOLLEY.